Dec. 12, 1933.   O. SCHAERER   1,939,137
MATERIAL FEEDING DEVICE FOR AUTOMATIC VERTICAL LATHES
Filed Nov. 11, 1932
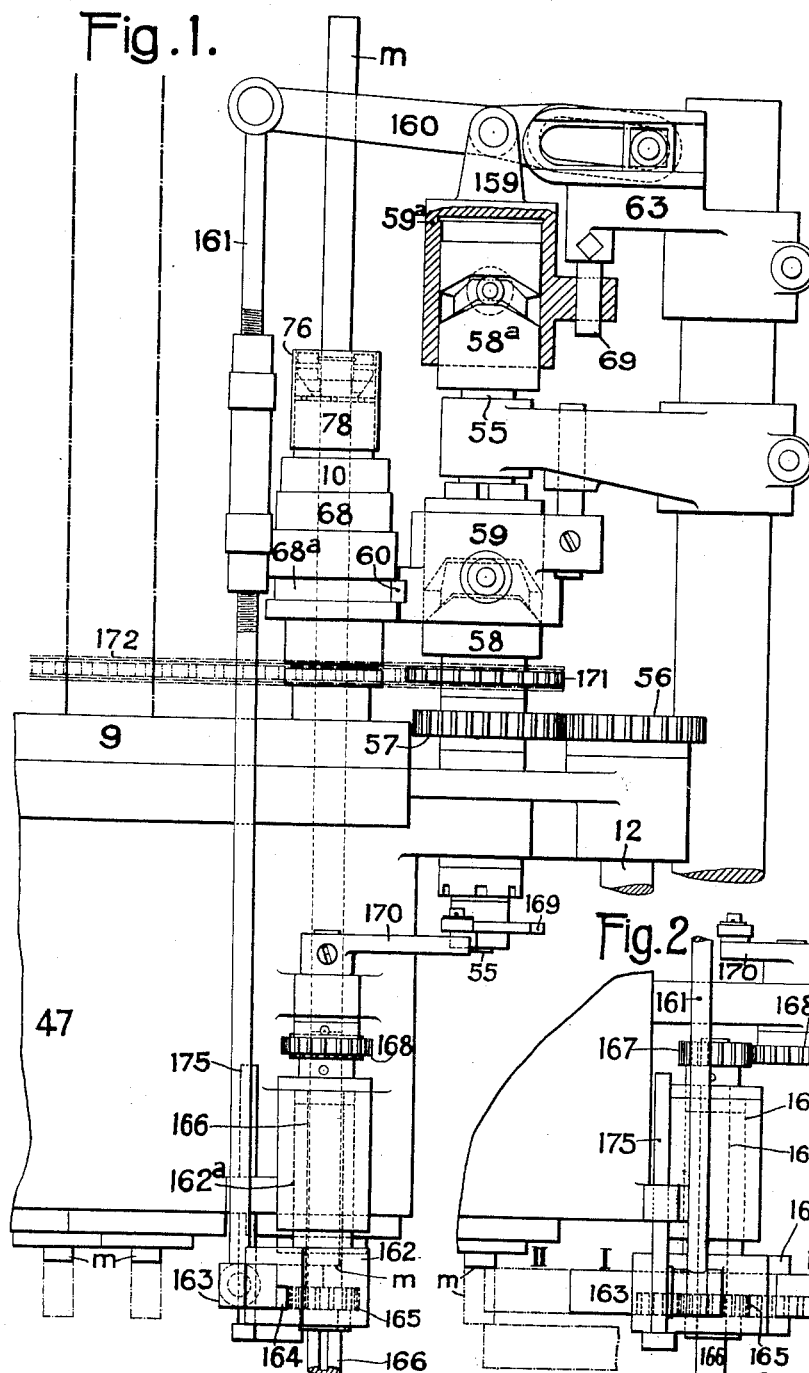

Patented Dec. 12, 1933

1,939,137

UNITED STATES PATENT OFFICE 1,939,137

MATERIAL FEEDING DEVICE FOR AUTOMATIC VERTICAL LATHES

Otto Schaerer, Basel, Switzerland

Application November 11, 1932, Serial No. 642,305, and in Germany November 30, 1931

6 Claims. (Cl. 29—37)

The employment of automatic rod-working machines or lathes of the vertical kind, such as disclosed by my copending application Ser. No. 549,734, filed July 9, 1931, comprising material rods advancing under their own weight is hindered by the fact that the rods fall too suddenly upon the opening of the holding members or chucks, since the material stop which serves to limit the stroke of the rod is subjected, in accordance with the weight of the rod, to correspondingly heavy blows and the descending rod at the same time has the tendency to rebound to a certain extent, so that inequalities in the length of the work-piece are unavoidable. This disadvantage becomes very marked in the case of a multi-spindle rod-working machine, since in this case more than one rod is often advanced, i. e. falls at the same time, so that the blows are correspondingly multiplied.

The object of the invention is to provide a device for advancing material for vertical multi-spindle rod-working lathes, in which the disadvantage referred to is removed. This device comprises a holding member or chuck, provided on each hollow spindle which is rotatable about its own axis as well as revolvable in space and serves to receive the work-piece rod, said holding member or chuck holding the rod or permitting it to fall, automatic means for controlling the opening or closing of the said chuck, and a stop device for limiting the fall of the work-piece rod, as it is known in machines of such kind, the device being characterized by that the work-piece stop is arranged to be movable in an upward direction and controlled in such a manner that upon the release of the chuck to feed material it receives the work-piece rod and descends with it through a distance corresponding to the working-length of the work-piece, returning upwards to a position in which it is again ready to receive, after the holding member or chuck closes. In this manner comparatively heavy rods of material can be supplied by their vertical fall to the desired treatment, without giving rise to blows or rebounds.

The accompanying drawing illustrates by way of example a constructional embodiment of the invention, Figure 1 being a view thereof in part-sectional elevation whilst Figure 2 is a detail view.

Referring now to the drawing, 47 indicates a part of the spindle stock of a vertical multi-spindle rod-working lathe, in which is journalled a rotary drum carrying the hollow work-piece spindles 10. This drum carries the spindles 10, with the work-pieces, intermittently to the various working places of the machine. A shaft 12, operated by the driving mechanism of the machine, drives a short control-shaft 55 through toothed gearing 56, 57, the control-shaft 55 carrying two grooved lifting-drums 58, 58$^a$. The lower drum 58 serves to control the holding member or chuck with which each spindle 10 is provided for holding and feeding the work-piece rod $m$, located in the spindle, and for this purpose it carries a control-sleeve 59 which executes a periodic up and down movement thereon, and is provided with a slide-block 60, which, when the work-piece spindle arrives at the control position, engages in the annular groove 68$^a$ in a slide socket 68, controlling the holding member or chuck of the work-piece spindle 10. The lifting-drum 58$^a$ is similarly provided with a movable control-sleeve 59$^a$, which like the control-sleeve 59 is movable up and down vertically and guided on a fixed pin 69 in such a manner that it cannot rotate.

The control-sleeve 59$^a$ carries a head member 159 by means of which it is linked to a double-armed lever 160, one arm of which is provided with a slide member and is guided in a corresponding slide member of a frame member 63 by means of a block, whilst to the other arm a push-rod 161, adjustable in length, is linked, the other end of which is connected to a material-stop carrier 162. This serves to receive and guide a material-stop 163.

The material-stop 163 is movable radially inwards and is provided with a toothed rack 164, with which gears a toothed wheel 165 mounted on an axle 166 extending through the material-stop carrier 162, and carrying at its other end a toothed wheel 167. The material-stop carrier 162 is located in a casing 162$^a$ secured to the frame. The toothed wheel 167 is periodically rotated to and fro by a toothed wheel 168 through a cam disc 169 and a roller-lever 170 located on the axle of the toothed wheel 168. The cam disc 169 is located on the control shaft 55, on which is provided a chain-wheel 171 over which passes an endless chain 172, which in double and multiple automatic machines, where the work-piece feeding takes place at different points of the machine, serves to connect all the control-shafts carrying the lifting drums, from which follows the feeding of the work-piece at all control-places of the machine, in order to permit the control of the parts to occur equally at all control-places of the machine.

Before operation the material stop 163 is in its withdrawn position and at the upper end of its vertical movement (indicated at 1 in Figure 2). Upon the commencement of operation it is shifted by the toothed wheel 165 gearing therewith, so that it projects below the material rod $m$ (taking up the position indicated at II in Figure 2).

In order to feed the material the work-piece spindle 10 is engaged by the control-sleeve 59. Whilst now through this on account of the lifting drum 58 the holding member or chuck of the work-piece spindle becomes released and thereupon the work-piece rod $m$ which becomes freed is received by the material-stop 163, the lifting drum $58^a$ at the same time effects, through the control-sleeve $59^a$ and the lever-rods 160, 161, a downward movement of the material-stop 163, thus permitting the material $m$ received by it to descend without rebound through a stroke corresponding to the length of the work-piece, into the position illustrated in dot-dash lines in Figure 2. The material rod is thus brought without jolting into its new working position, in which the holding member or chuck of the work-piece spindle is again closed, there occurring thus no rebound at all of the material rod, which always comes into the correct position for treatment. When the control-sleeve 59 has released the material-rod $m$, the cam disc 169 acting on the lever 170 effects, through the toothed gearing 167, 168, the return movement of the material-stop 163, from its position of engagement, whilst the control-sleeve $59^a$, under the action of the lifting drum $58^a$ causes the material-stop carrier 162 to rise with the material-stop 163 into the position (I in Figure 2) in which it is ready for the next insertion or engagement. During the vertical movement the accurate guidance of the material-stop carrier 162 is ensured by the guide-bar 175.

As the feeding of material is governed by the vertical displacement of the material-stop 163, in that this latter permits the material rod to descend through the necessary working-distance, the length of movement of the material can be regulated by substitution of the lifting drum $58^a$ by another of different cam groove, or by displacing the pivoting point of the lever 160 in the slots of lever 160 and carrier 63.

When several control shafts 55 with lifting-drums 58, $58^a$ are available, e. g. in double or multiple automatic machines, where the feeding of material is to be effected at several places on the machine, the movement of the control shaft 55 located adjacent to the shaft 12 will be transmitted, through the chain wheel 171 and the chain 172, to the other similar control-shafts located on the spindle-stock. The slidable mounting of the slide-sockets directly on the lifting drums permits an extremely simple, short method of construction and eliminates thus the jamming of the control parts in known arrangements.

In order, with long material rods of correspondingly large diameter and great weight, to relieve the material-stop member, or to ensure the freedom of movement thereof, the material-rod is braked during its downward movement by brake blocks 78 located in the work-piece spindle, and which close when the holding member or chuck opens, so that a gradual sinking of the material-rod takes place.

The movement of the material-stop member can be effected hydraulically instead of mechanically.

What I claim is:—

1. A material feeding device for vertical rod-working multi-spindle lathes, comprising a chuck on each hollow spindle arranged to permit the work-piece to be fed by fall to the working position, controlling means for the opening or closing of said chuck, a downwards and upwards movable material-stop for receiving in its uppermost position the falling work-piece when the chuck is opened, means for positively guiding said material-stop in its up and down movement, controlling means for the up and down movement of said material-stop and interconnecting means between said chuck controlling means and said material-stop controlling means so arranged as to cause said material-stop to descend with the work-piece which it supports upon release of the chuck through the necessary length and to then return upwards after closure of the chuck to a position ready for again engaging the work-piece.

2. A material feeding device for vertical rod-working multi-spindle lathes, comprising a chuck on each hollow spindle arranged to permit the work-piece to be fed by fall to the working position, a controlling cam device for the opening or closing of said chuck, a downwards and upwards movable material-stop for receiving in its uppermost position the falling work-piece when the chuck is opened, means for positively guiding said material-stop in its up and down movement, a controlling cam device for the up and down movement of said material-stop and interconnecting means between said chuck controlling means and said material-stop controlling means so arranged as to cause said material-stop to descend with the work piece which it supports upon release of the chuck through the necessary length and to then return upwards after closure of the chuck to a position ready for again engaging the work-piece.

3. A material feeding device for vertical rod-working multi-spindle lathes, comprising a chuck on each hollow spindle arranged to permit the work-piece to be fed by fall to the working position, a controlling cam device for the opening or closing of said chuck, a downwards and upwards movable material-stop for receiving in its uppermost position the falling work-piece when the chuck is opened, means for positively guiding said material-stop in its up and down movement, a controlling cam device for the up and down movement of said material stop and a common control shaft for both said chuck controlling means and said material-stop controlling means, for the purpose of rendering the latter dependent of the former.

4. A material feeding device for vertical rod-working multi-spindle lathes, comprising a chuck on each hollow spindle arranged to permit the work-piece to be fed by fall to the working position, a controlling cam device for the opening or closing of said chuck, a downwards and upwards movable material-stop for receiving in its uppermost position the falling work-piece when the chuck is opened, means for positively guiding said material-stop in its up and down movement, a controlling cam device for the up and down movement of said material-stop and a common control shaft for both said chuck controlling means and said material-stop controlling means, for the purpose of rendering the latter dependent of the former, said control shaft being provided with a chain gear for the purpose of being connected with the control shafts associated to the other working spindles of the machine.

5. A material feeding device for vertical rod-working multi-spindle lathes, comprising a chuck on each hollow spindle arranged to permit the work-piece to be fed by fall to the working position, controlling means for the opening or closing of said chuck, a downwards and upwards movable material-stop for receiving the falling work-piece when the chuck is opened, means for positively guiding said material-stop in its up and down movement, controlling means for the up and down movement of said material-stop, these controlling means having movable members for projecting the stop forwards below the material rod before its downward movement and for retracting same before its upward movement, and interconnecting means between said chuck controlling means and said material-stop controlling means so arranged as to cause said material-stop to descend with the work-piece upon release of the chuck through the necessary length and to then return upwards after closure of the chuck to a position ready for again engaging the work-piece.

6. A material feeding device for vertical rod-working multi-spindle lathes, comprising a chuck on each hollow spindle arranged to permit the work-piece to be fed by fall to the working position, controlling means for the opening or closing of said chuck, a downwards and upwards movable material-stop for receiving the falling work-piece when the chuck is opened, means for positively guiding said material-stop in its up and down movement, a braking device combined with said chuck to operate upon release thereof on to the work-piece and to thus relieve the material-stop during the fall of the material, controlling means for the up and down movement of said material-stop and interconnecting means between said chuck controlling means and said material-stop controlling means so arranged as to cause said material-stop to descend with the work-piece upon release of the chuck through the necessary length and to then return upwards after closure of the chuck to a position ready for again engaging the work-piece.

OTTO SCHAERER.